(12) United States Patent
Devall

(10) Patent No.: US 6,170,538 B1
(45) Date of Patent: Jan. 9, 2001

(54) FILLER NECK CUP PRESSURE REGULATOR

(75) Inventor: Jeffrey Devall, Liberty, IN (US)

(73) Assignee: Stant Manufacturing Inc., Connersville, IN (US)

( * ) Notice: Under 35 U.S.C. 154(b), the term of this patent shall be extended for 0 days.

(21) Appl. No.: 09/309,120

(22) Filed: May 10, 1999

(51) Int. Cl.$^7$ ...................................................... B65B 1/04
(52) U.S. Cl. ......................... 141/59; 141/301; 220/86.2; 137/587
(58) Field of Search ........................... 141/59, 301, 302; 220/86.2; 137/43, 587–589

(56) References Cited

U.S. PATENT DOCUMENTS

| | | |
|---|---|---|
| 3,477,611 | 11/1969 | Niles . |
| 3,907,153 | 9/1975 | Mutty . |
| 4,690,293 | 9/1987 | Uranishi et al. . |
| 5,462,100 | * 10/1995 | Covert et al. ............................ 141/59 |
| 5,579,742 | 12/1996 | Yamazaki et al. . |
| 5,680,848 | 10/1997 | Katoh et al. . |
| 5,687,778 | 11/1997 | Harris . |
| 6,003,499 | * 12/1999 | Devall et al. ......................... 137/588 |

* cited by examiner

Primary Examiner—Steven O. Douglas
(74) Attorney, Agent, or Firm—Barnes & Thornburg

(57) ABSTRACT

A fuel system is provided having a fuel tank formed to include an interior region, a fuel vapor discharge apparatus coupled to the fuel tank to vent fuel vapor from the interior region of the fuel tank, a fuel delivery apparatus formed to include an interior region and coupled to the fuel tank to deliver fuel to the interior region of the fuel tank, and a fuel vapor recirculation apparatus in fluid communication with the interior region of the fuel tank. The fuel vapor recirculation apparatus delivers fuel vapor from the interior region of the fuel tank to the interior region of the fuel delivery apparatus, and includes a sensor in fluid communication with the interior region of the fuel delivery apparatus to sense pressure extant in the interior region of the fuel delivery apparatus, a housing, and a flow restrictor coupled to the sensor and positioned to lie in the housing to move between a first position restricting the flow of fuel vapor from the fuel tank to the fuel delivery apparatus in response to sensations from the sensor without regard to changes in the vapor pressure extant in the interior region of the fuel tank and a second position permitting flow of fuel vapor from the fuel tank to the fuel delivery apparatus.

23 Claims, 4 Drawing Sheets

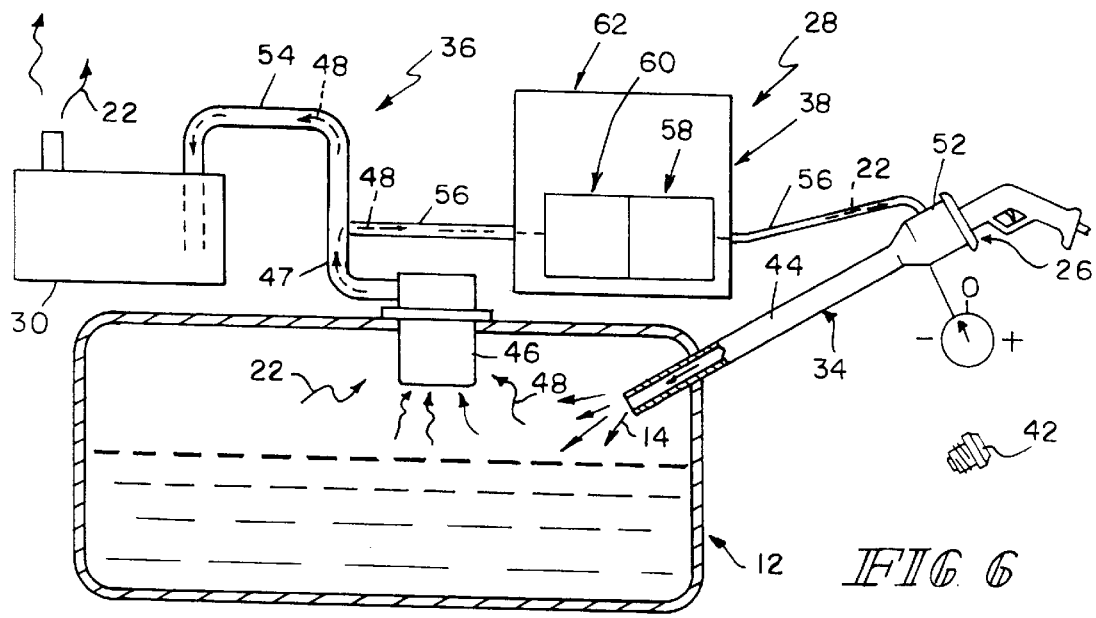
FIG. 6
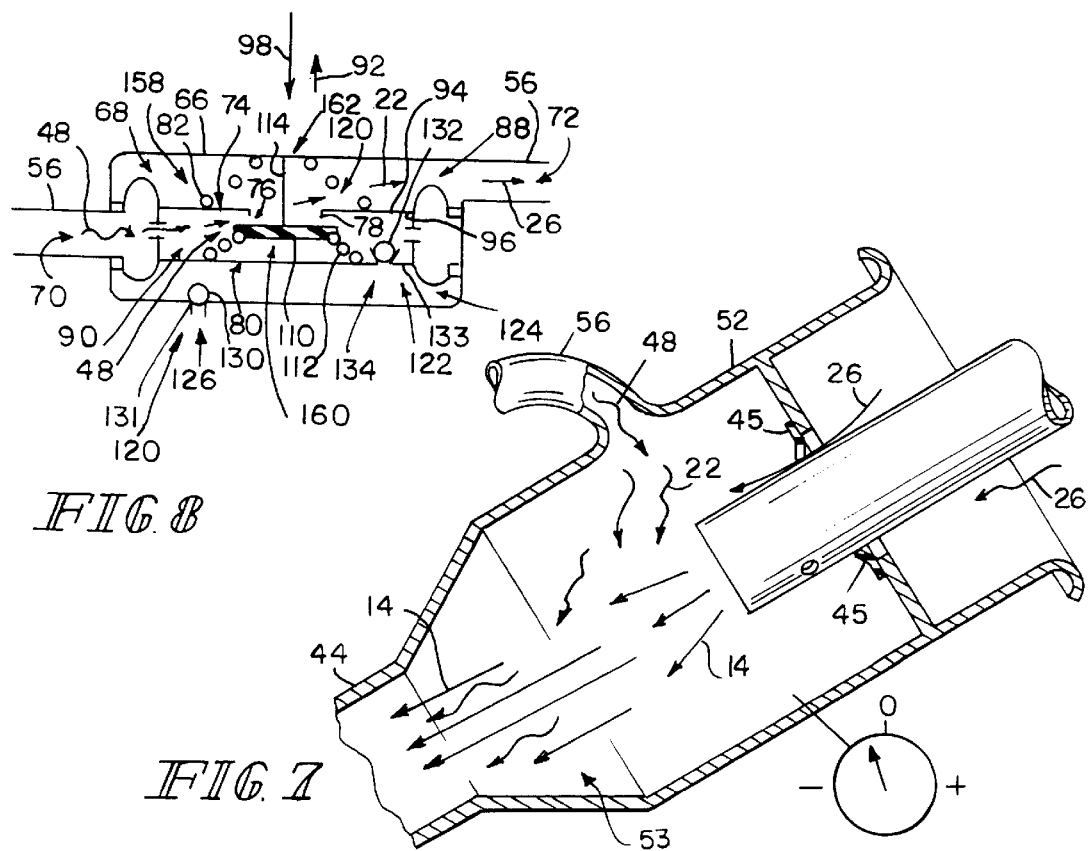
FIG. 8
FIG. 7

FILLER NECK CUP PRESSURE REGULATOR

BACKGROUND OF THE INVENTION

This invention relates to vehicle fuel systems including a fuel tank and a fill cup for receiving liquid fuel. More particularly, this invention relates to a fuel vapor recirculation systems for communicating fuel vapor from the fuel tank to the fill cup.

It has been recognized that fuel vapor is generated in the fuel tank during operation of the vehicle, for example, by evaporation or by sloshing of the liquid fuel against the walls of the fuel tank. Excessive pressure can build up in the fuel tank as a result of the newly formed fuel vapor unless control devices are provided to vent the fuel vapor from the fuel tank. These control devices communicate the fuel vapor to a canister which contains adsorption agents that are intended to adsorb the fuel vapors.

It has also been recognized that air is drawn into and through the fill cup during refueling. During refueling, flow of fuel into the fill cup and operation of the refueling nozzle creates negative pressure in the fill cup. This negative pressure then draws outside air into the fill cup. This outside air adds to the pressure within the fuel system and must be vented from the system in a manner similar to the fuel vapor mentioned above. However, unlike the fuel vapor, the outside air is not adsorbed by the adsorption agent and is more difficult to pass through the canister. Because of the difficulty in passing air through the canister, a larger canister must be used with the fuel system. This can be somewhat offset if the outside air being drawn into the fill cup is replaced by recirculated fuel vapors.

According to the present invention, a fuel system is provided including a fuel tank, a fuel vapor discharge apparatus coupled to the fuel tank, a fuel delivery apparatus coupled to the fuel tank, and a fuel vapor recirculation apparatus. The fuel tank is formed to include an interior region and the fuel vapor discharge apparatus vents fuel vapor from the interior region of the fuel tank. The fuel delivery apparatus is formed to include an interior region and delivers fuel to the interior region of the fuel tank. The fuel vapor recirculation apparatus is in fluid communication with the interior region of the fuel tank to deliver fuel vapor from the interior region of the fuel tank to the interior region of the fuel delivery apparatus.

The fuel vapor recirculation apparatus includes a sensor, a housing, and a flow restrictor. The sensor is in fluid communication with the interior region of the fuel delivery apparatus to sense pressure extant in the interior region of the fuel delivery apparatus. The flow restrictor is coupled to the sensor and is positioned to lie in the housing to move between a first position restricting the flow of fuel vapor from the fuel tank to the fuel delivery apparatus in response to sensations from the sensor and a second position permitting flow of fuel vapor from the fuel tank to the fuel delivery apparatus in response to sensations from the sensor.

A method for communicating fuel vapor from an interior region of a vehicle fuel tank to an interior region of a fuel delivery apparatus coupled to the vehicle fuel tank is provided. The method includes the steps of providing a conduit and a valve, sensing pressure, and moving the valve. The conduit defines a passage configured to communicate fuel vapor from an interior region of a fuel tank to an interior region of a fuel delivery apparatus. The valve is coupled to the conduit and includes a flow restrictor configured to move between a first position restricting the flow of fuel vapor through the passage and a second position permitting the flow of fuel vapor through the passage and a sensor coupled to the valve. The sensing step senses pressure extant in the interior region of the fuel delivery apparatus. The moving step moves the valve to the second position when pressure extant in the interior region of the fuel delivery apparatus is at a predetermined level.

Additional features of the invention will become apparent to those of ordinary skill in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a diagrammatic illustration of the fuel system of FIG. 3 showing the fuel-dispensing nozzle operated to gradually refill the fuel tank with liquid fuel, a moderate amount of fuel vapor/air mixture being drawn through the fuel vapor recirculation apparatus and a limited amount of outside air being drawn into the fill cup as a result of the gradual refilling of the fuel tank, and the fuel vapor discharge apparatus venting fuel vapor and outside air from the fuel tank;

FIG. 7 is a cross-sectional view of the fill cup of FIG. 6 showing the liquid fuel being gradually introduced to the fill cup through the fuel-dispensing nozzle creating moderate negative pressure therein drawing the moderate amount of fuel vapor/air mixture through fuel vapor recirculation apparatus and the limited amount of outside air into the fill cup past the sealing mechanism;

FIG. 8 is a diagrammatic illustration of the preferred embodiment recirculation control valve showing the valve member in a partially opened position providing less restriction so that fuel vapor/air mixture is permitted to pass thereby;

DETAILED DESCRIPTION OF THE DRAWINGS

Figure 1:
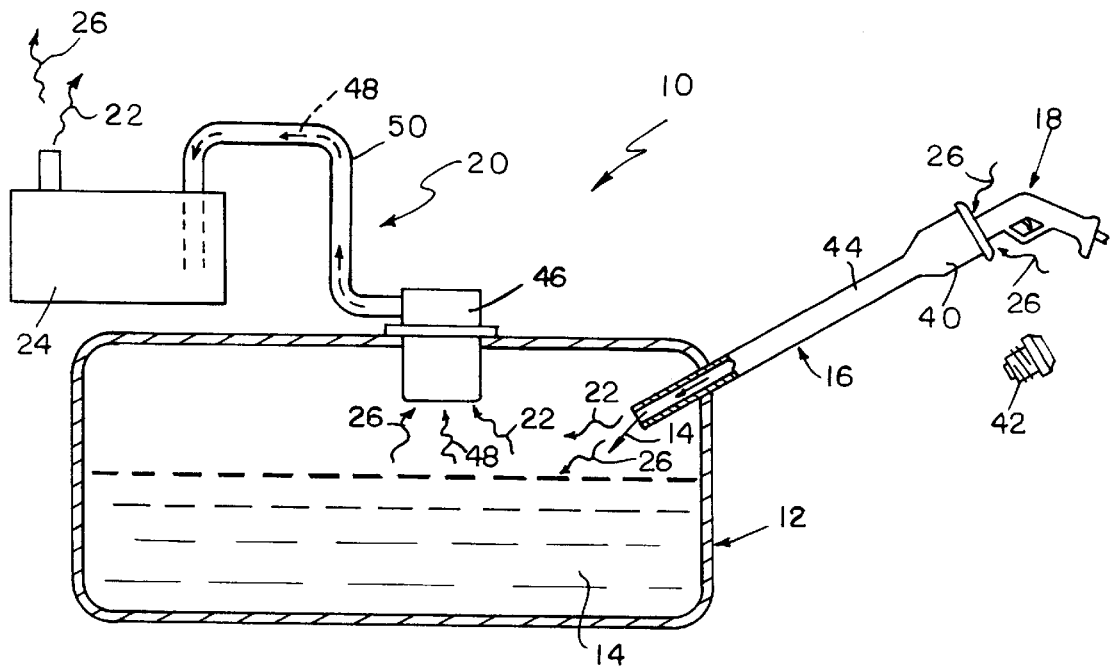
FIG. 1 is a diagrammatic illustration of a conventional fuel system showing the conventional fuel system including a fuel tank, a fuel delivery apparatus coupled to the fuel tank, and a fuel vapor discharge apparatus coupled to the fuel tank, a fuel-dispensing nozzle inserted into a fill cup of the fuel delivery apparatus and operated to refill the fuel tank, outside air being drawn into the fill cup as a result of the refilling, and the fuel vapor discharge apparatus venting fuel vapor and outside air from the fuel tank.

An illustration of a conventional fuel system 10 is shown in FIG. 1. Conventional fuel system 10 includes a fuel tank 12 for storage of liquid fuel 14, a fuel delivery apparatus 16 for delivering liquid fuel 14 to fuel tank 12 from a fuel dispensing nozzle 18, and a fuel vapor discharge apparatus 20 for discharging excess fuel vapor 22 from fuel tank 12.

Figure 2:
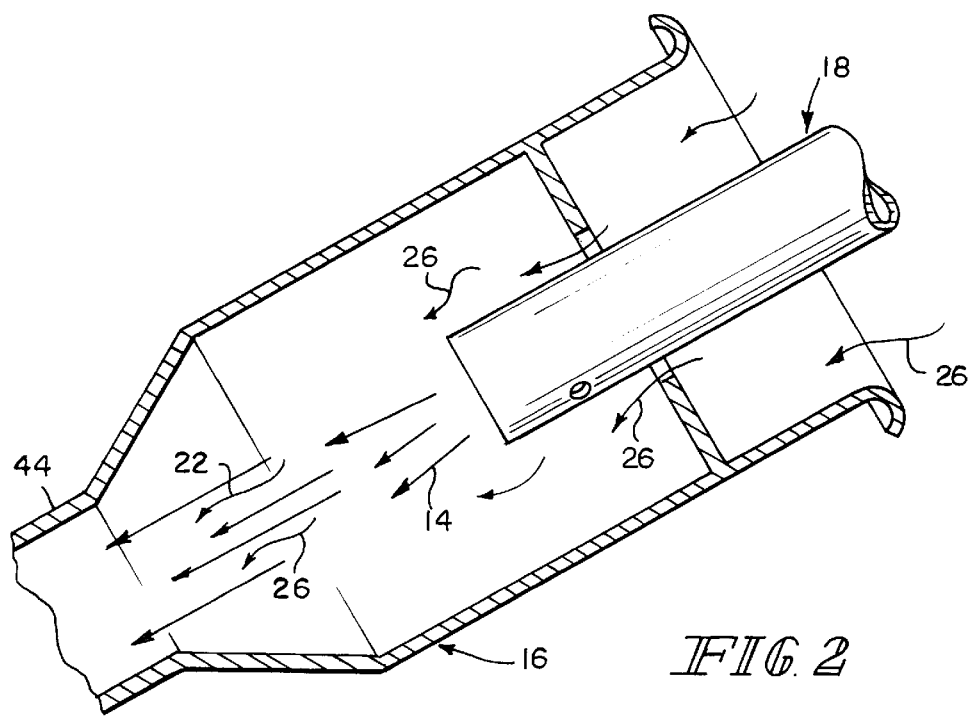
FIG. 2 is a cross-sectional view of the fill cup of FIG. 2 showing the liquid fuel being introduced to the fill cup through the fuel-dispensing nozzle creating negative pressure therein that draws the outside air into the fill cup.

Fuel vapor discharge apparatus 20 includes a canister 24 that contains an adsorption agent (not shown) that adsorbs the fuel vapor 22 vented from fuel tank 12. As shown in FIG. 2, outside air 26 is introduced into conventional fuel system 10 through fuel delivery apparatus 16. Outside air 26 is difficult to pass through canister 24 and requires that the size of canister 24 be increased to compensate for the difficulty in passing outside air 26 through canister 24.

Figure 3:
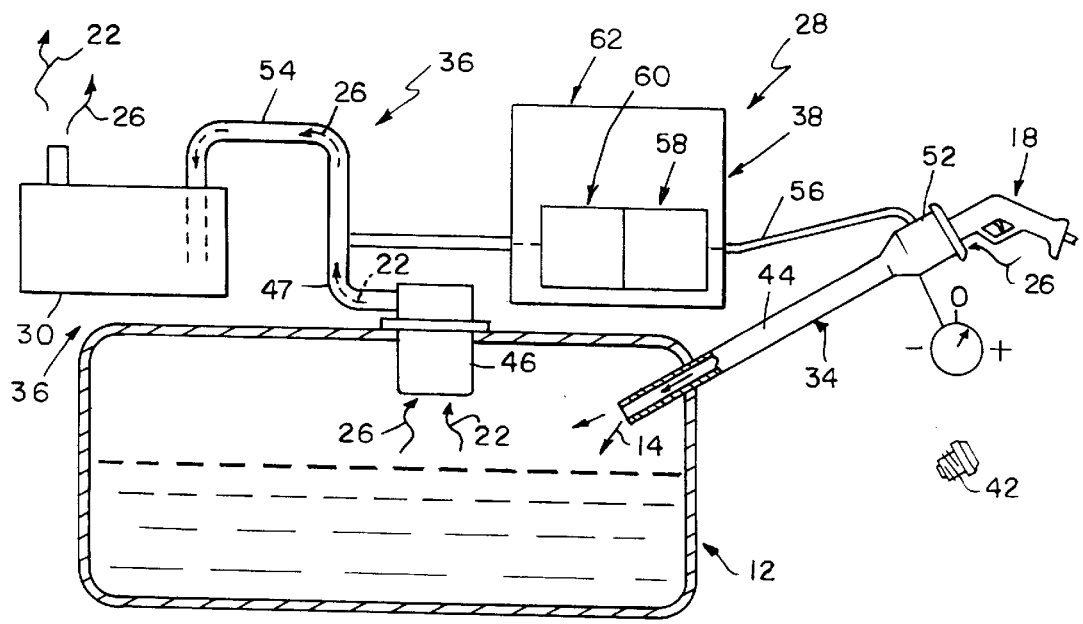
FIG. 3 is a diagrammatic illustration of a fuel system in accordance with the present disclosure showing the fuel system including a fuel tank, a fuel delivery apparatus coupled to the fuel tank, a fuel vapor discharge apparatus coupled to the fuel tank, and a fuel vapor recirculation apparatus having a conduit coupled to the fuel vapor discharge apparatus and the fuel delivery apparatus and a recirculation control valve coupled to the conduit, the fuel-dispensing nozzle inserted into a fill cup of the fuel delivery apparatus including a sealing mechanism and operated to slowly refill the fuel tank with liquid fuel, a limited amount of outside air being drawn into the fill cup past the sealing mechanism as a result of the slow refilling, and the fuel vapor discharge apparatus venting fuel vapor and outside air from the fuel tank.
Figure 9:
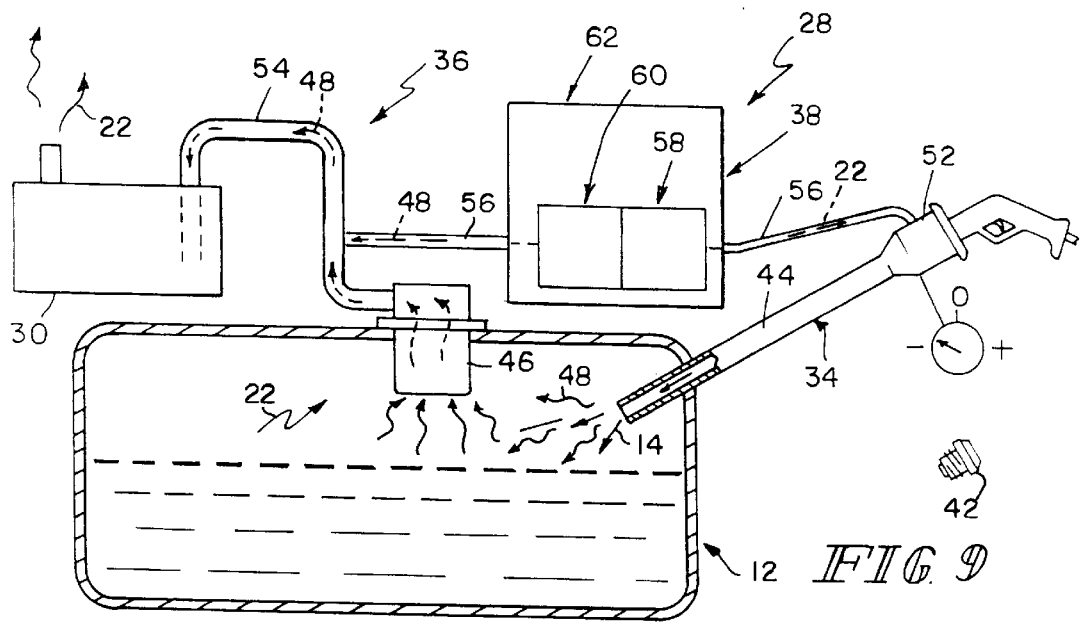
FIG. 9 is a diagrammatic illustration of the fuel system of FIG. 3 showing the fuel-dispensing nozzle operated to rapidly refill the fuel tank with liquid fuel, a large amount of fuel vapor/air mixture being drawn through the fuel vapor recirculation apparatus and a limited amount of outside air being drawn into the fill cup as a result of the rapid refilling, and the fuel vapor discharge apparatus venting fuel vapor and outside air from the fuel tank.

A fuel system 28, according to the present disclosure, reduces the amount of outside air 26 passed through a canister 30 and also decreases the amount of fuel vapor 22 processed by canister 30. As shown in FIGS. 3, 6, and 9, fuel system 28 includes fuel tank 12, a fuel delivery apparatus 34, a fuel vapor discharge apparatus 36 including canister 30, and a fuel vapor recirculation apparatus 38 for recirculating fuel vapor 22 from fuel tank 12 to fuel delivery apparatus 34.

The size of canister 30 is reduced by reducing the volume of fuel vapor 22 and outside air 26 passed through canister 30. The volume of fuel vapor 22 passed through canister 30 is reduced by recirculating fuel vapor 22 from fuel tank 12 to fuel delivery apparatus 34. Recirculation reduces the volume of outside air 26 introduced to fuel system 28 by replacing outside air 26 with fuel vapor 22.

Recirculation provides fuel vapor/air mixture 48 to fuel delivery apparatus 34 from fuel tank 12 that would otherwise be routed to canister 30 but now displaces a portion of outside air 26 that would otherwise be drawn into fuel system 28. Recirculation reduces the volume of fuel vapor 22 present in fuel system 28 that must be adsorbed by canister 30. Because fuel vapor 22 is recirculated back to fuel delivery apparatus 34, fuel vapor 22 has a second chance to condense into liquid fuel 14 in fuel tank 12 or in liquid fuel 14 being introduced to fuel system 28. Condensing reduces the volume of fuel vapor 22 by converting fuel vapor 22 into liquid fuel 14. Thus, because less fuel vapor 22 exists in fuel system 28, less fuel vapor 22 needs to be adsorbed by canister 30 of fuel system 28 and the size of canister 30 of fuel system 28 can be reduced in comparison to canister 24 of conventional fuel system 10.

Because less outside air 26 is drawn into fuel system 28, canister 30 according to the present disclosure operates more efficiently than canister 24 of conventional fuel system 10 because canister 24 of conventional fuel system 10 must process more efficiency-reducing outside air 26 than canister 30 must process. Thus, canister 30 of fuel system 28 according to the present disclosure is designed to be smaller than less efficiently operating canister 24 of conventional fuel system 10. By reducing the size of canister 30 through recirculation, labor and material costs can be reduced for fuel system 28 in comparison to conventional fuel system 10.

Fuel delivery apparatus 16 of conventional fuel system 10 includes a fill cup 40 for accepting fuel dispensing nozzle 18 during refueling, a closure cap 42 for closing over and substantially sealing fill cup 40 after refueling, and a filler neck 44 coupled to fill cup 40 and fuel tank 12 for communicating liquid fuel 14 to fuel tank 12. As liquid fuel 14 is introduced to fill cup 40, the speed and flow of liquid fuel 14 through fuel dispensing nozzle 18 creates negative pressure within fill cup 40. The negative pressure created within fill cup 40 draws outside air 26 into and through fill cup 40. This outside air 26 is then entrained within liquid fuel 14 and drawn into fuel tank 12.

As the rate of flow of liquid fuel 14 into fill cup 40 increases, the pressure level in fill cup 40 becomes increasingly negative. This increased negative pressure increases the flow rate of outside air 26 into conventional fuel system 10 as the flow rate of liquid fuel 14 into fill cup 40 increases. As previously mentioned, this outside air 26 is difficult to pass through canister 24 of conventional fuel system 10 and requires that the size of canister 24 be increased to compensate for this inefficiency.

As liquid fuel 14 travels through fuel delivery apparatus 34 and fuel tank 12, liquid fuel 14 transforms from its liquid state to a vapor state into fuel vapor 22. Outside air 26 mixes with fuel vapor 22 to form fuel vapor/air mixture 48 within conventional fuel system 10. Fuel vapor/air mixture 48 must often be vented from fuel tank 12 to prevent excess build up of pressure in fuel tank 12 that impedes the flow of liquid fuel 14 into fuel tank 14 and can create potential structure-damaging pressure within conventional fuel system 10.

To prevent structural damage, the high pressure level of fuel vapor/air mixture 48 is vented from fuel tank 12 of conventional fuel system 10. To aid in the venting of fuel vapor/air mixture 48 away from fuel tank 12, fuel vapor discharge apparatus 20 communicates fuel vapor/air mixture 48 from fuel tank 12, adsorbs a portion of fuel vapor 22 within fuel vapor/air mixture 48, and releases outside air 26 within fuel vapor/air mixture 48 and the remaining portion of fuel vapor 22 into the atmosphere. Fuel vapor discharge apparatus 20 includes an ORVR control valve 46 coupled to fuel tank 12 for regulating the flow of fuel vapor/air mixture 48 from fuel tank 12 and preventing the flow of liquid fuel 14 from fuel tank 12 in the event of vehicle roll-over. Fuel vapor discharge apparatus 20 of conventional fuel system 10 further includes canister 24 for adsorbing fuel vapor 22 and a fuel vapor discharge conduit 50 coupled to ORVR control value 46 and canister 24 for communicating fuel vapor/air mixture 48 from ORVR control valve 46 to canister 24.

As shown in FIG. 3, to aid in the venting of fuel vapor/air mixture 48 from fuel tank 12, fuel vapor discharge apparatus 36 of the present disclosure communicates fuel vapor/air mixture 48 from fuel tank 12, adsorbs a portion of fuel vapor 22 within fuel vapor/air mixture 48, and releases outside air 26 within fuel vapor/air mixture 48 and the remaining portion of fuel vapor 22 into the atmosphere. Fuel vapor discharge apparatus 20 includes ORVR control valve 46 coupled to fuel tank 12 for regulating the flow of fuel vapor/air mixture 48 from fuel tank 12 and preventing the flow of liquid fuel 14 from fuel tank 12 in the event of vehicle roll-over. Fuel vapor discharge apparatus 36 further includes canister 30 for adsorbing fuel vapor 22 and a fuel vapor discharge conduit 54 coupled to ORVR control value 46, and canister 30.

Fuel delivery apparatus 34 of fuel system 28 includes a fill cup 52 for accepting fuel dispensing nozzle 18 during refueling, gas cap 42 for closing over and substantially sealing fill cup 52 after refueling, filler neck 44 coupled to fill cup 52 and fuel tank 12, and an interior region 83 defined by fill cup 52 and filler neck 44 for communicating liquid fuel 14 to fuel tank 12. Fill cup 52 is coupled to fuel vapor recirculation apparatus 38 and includes a sealing mechanism 45 that loosely receives fuel dispensing nozzle 18 during refueling. As with conventional fuel system 10, the introduction of liquid fuel 14 into fuel system 28 creates negative pressure within fill cup 52. The negative pressure created within fill cup 52 draws fuel vapor/air mixture 48 through fuel vapor recirculation apparatus 38 into and through fill cup 52 and outside air 26 past sealing mechanism 45.

By drawing fuel vapor/air mixture 48 through recirculation apparatus 38, fuel vapor/air mixture 48 is recirculated from fuel tank 12 into fill cup 52. Fuel vapor/air mixture 48 is drawn from fuel tank 12 to fill cup 52 by the negative pressure created in fill cup 52 during refueling and is then entrained into the liquid fuel 14 back into fuel tank 12. This recirculation of fuel vapor/air mixture 48 reduces the volume of outside 26 drawn into fill cup 52. The recirculation of fuel vapor/air mixture 48 causes this reduction by displacing a portion of the outside air 26 normally drawn into fill cup 52 with recirculated fuel vapor/air mixture 48.

As fuel vapor/air mixture 48 is recirculated through fuel system 28, fuel vapor 22 within fuel vapor/air mixture 48 has an additional chance to condense within liquid fuel 14, fuel tank 12, and the other components of fuel system 28. This condensing transforms fuel vapor 22 from its vapor state to a liquid state into liquid fuel 14. Thus, the overall volume of fuel vapor 22 and fuel vapor/air mixture 48 is reduced so that the condensed portion of the fuel vapor/air mixture 48 need not be vented from fuel tank 12 of fuel system 28. Therefore, less fuel vapor/air mixture 48 needs to vented from fuel system 28 to prevent excess build up of pressure in fuel tank 12 that impedes the flow of liquid fuel 14 into fuel tank 12 and creates potential structural damaging pressure within fuel system 28.

As the rate of flow of liquid fuel 14 into fill cup 52 increases, the pressure level in fill cup 52 becomes increasingly negative. This increased negative pressure increases the recirculation rate of fuel vapor/air mixture 48 from fuel tank 12 to fill cup 52 as flow rate of liquid fuel 14 into fill cup 52 increases. Thus, as the rate of flow of liquid fuel 14 into fill cup 52 increases, the flow rate of outside air 26 does not increase or only increases slightly as recirculated fuel vapor/air mixture 48 meets the additional needs of the increased negative pressure in fill cup 52.

Fuel vapor recirculation apparatus 38 includes a fuel vapor recirculation conduit 56 for communicating fuel vapor/air mixture 48, a pressure sensor 58 for detecting pressure levels in fill cup 52, and a flow restrictor 60 for regulating the flow of fuel vapor/air mixture 48 through fuel vapor recirculation conduit 56. According to a preferred embodiment of the present invention, pressure sensor 58 and flow restrictor 60 act as a recirculation control valve 62 that both senses the pressure level in fill cup 52 and regulates the flow of fuel vapor/air mixture 48 through fuel vapor recirculation conduit 56 based on the pressure level in fill cup 52 and fuel tank 12. Fuel vapor recirculation apparatus 38 further includes ORVR control valve 46 coupled to fuel tank 12 and a portion 47 of fuel vapor discharge conduit 54 coupled to ORVR control valve 46 so that fuel vapor recirculation apparatus 38 and fuel vapor discharge apparatus 20 share several components. In alternative embodiments, fuel vapor recirculation conduit 52 is coupled to ORVR control valve 46 or directly to fuel tank 12.

Fuel vapor recirculation conduit 56 helps communicate fuel vapor/air mixture 48 from fuel tank 12 to fill cup 52 during recirculation. Fuel vapor recirculation conduit 56 is coupled to portion 47 of fuel vapor discharge conduit 54 and fill cup 52 so that fuel vapor recirculation conduit 56 is in fluid communication with fuel tank 12 of fuel system 28 and fill cup 52, respectively. Pressure differentials between fuel tank 12 and fill cup 52 pull fuel vapor/air mixture 48 through fuel vapor recirculation conduit 56 from fill tank 12 into fill cup 52. For example, the negative pressure in fill cup 52 created during refueling causes fuel vapor/air mixture 48 to recirculate from fuel tank 12 to fill cup 52 through fuel vapor recirculation conduit 56.

Recirculation control valve 62 operates to regulate this flow of fuel vapor/air mixture 48 through fuel vapor recirculation conduit 56 based on these pressure differentials. Pressure sensor 58 detects the pressure differentials between fill cup 52 and fuel tank 12 and flow restrictor 60 increases or decreases the flow resistance through fuel vapor recirculation apparatus 38 based on the detection by pressure sensor 58. This change in flow resistance adjusts the flow rate of fuel vapor/air mixture 48 from fuel tank 12 to fill cup 52. When pressure sensor 58 detects an increased pressure differential, flow restrictor 60 decreases the flow restriction in fuel vapor recirculation apparatus 38 to permit more fuel vapor/air mixture 48 to flow to fill cup 52. When pressure sensor 58 detects a decreased pressure differential, flow restrictor 60 increases the flow restriction in fuel vapor recirculation apparatus 38 to reduce the flow of fuel vapor/ air mixture 48 to fill cup 52.

Figure 5:
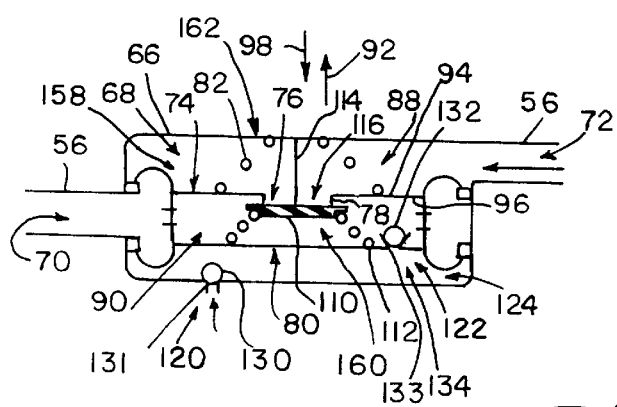
FIG. 5 is a diagrammatic illustration of a preferred embodiment of a recirculation control valve showing the recirculation control valve including a housing, a pair of diaphragms coupled to the housing, and a valve member in a closed position restricting the flow of fuel vapor through the housing.
Figure 4:
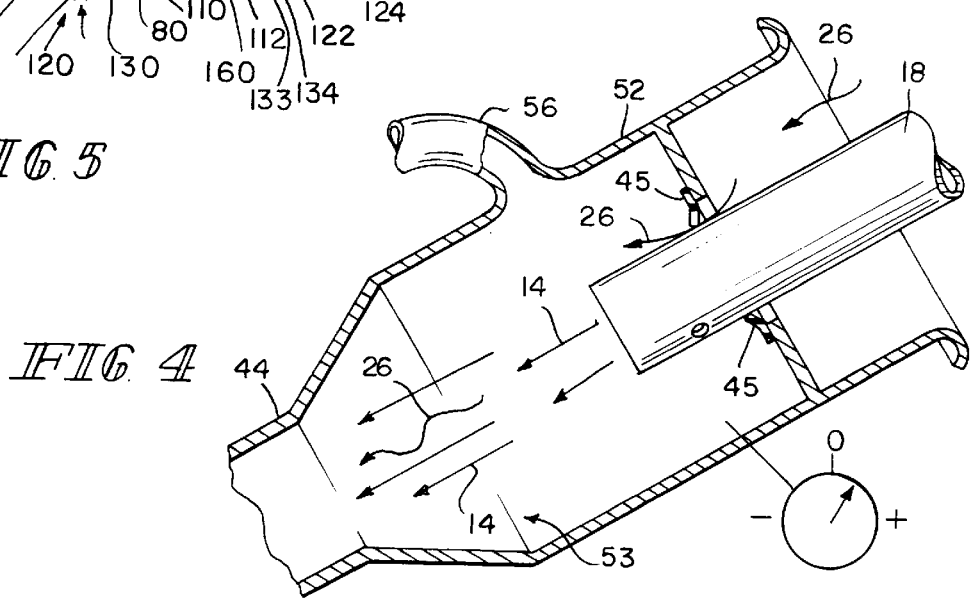
FIG. 4 is a cross-sectional view of the fill cup of FIG. 3 showing the liquid fuel being slowly introduced to the fill cup through the fuel-dispensing nozzle creating negligible pressure therein that draws the limited amount of outside air into the fill cup past a sealing mechanism.

As shown in FIGS. 3–5, liquid fuel 14 is introduced into fuel system 28 at a relatively low rate of flow. This low rate of flow of liquid fuel 14 creates a neutral pressure condition with very little if any negative pressure within fill cup 52 so that fill cup 52 is at or near atmospheric pressure as represented by a diagrammatic pressure gage 64 as shown in FIG. 4 (diagrammatic pressure gage 64 is shown for illustrative purposes). Because no negative pressure exists in fill cup 52, pressure sensor 58 detects a reduced pressure differential between fill cup 52 at atmospheric pressure and fuel tank 12. Accordingly, flow restrictor 60 prevents any recirculation of fuel vapor/air mixture 48 through fuel vapor recirculation apparatus 38.

As shown in FIGS. 6–8, liquid fuel 14 is introduced into fuel system 28 at a moderate rate of flow. This moderate rate of flow of liquid fuel 14 creates a moderate pressure condition with moderately negative pressure within fill cup 52 so that fill cup 52 is below atmospheric pressure as represented by diagrammatic pressure gage 64 as shown in FIG. 7. Because moderately negative pressure exists in fill cup 52, pressure sensor 58 detects an increased pressure differential between fill cup 52 at moderately negative pressure and fuel tank 12. Accordingly, flow restrictor 60 permits moderate recirculation of fuel vapor/air mixture 48 through fuel vapor recirculation apparatus 38.

Figure 11:
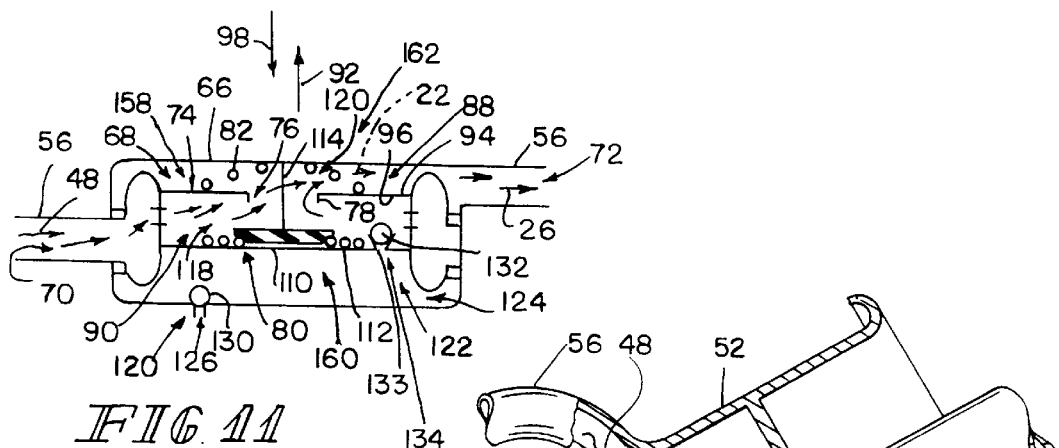
FIG. 11 is a diagrammatic illustration of the preferred embodiment recirculation control valve showing the valve member in a fully opened position permitting fuel vapor to pass thereby.
Figure 10:
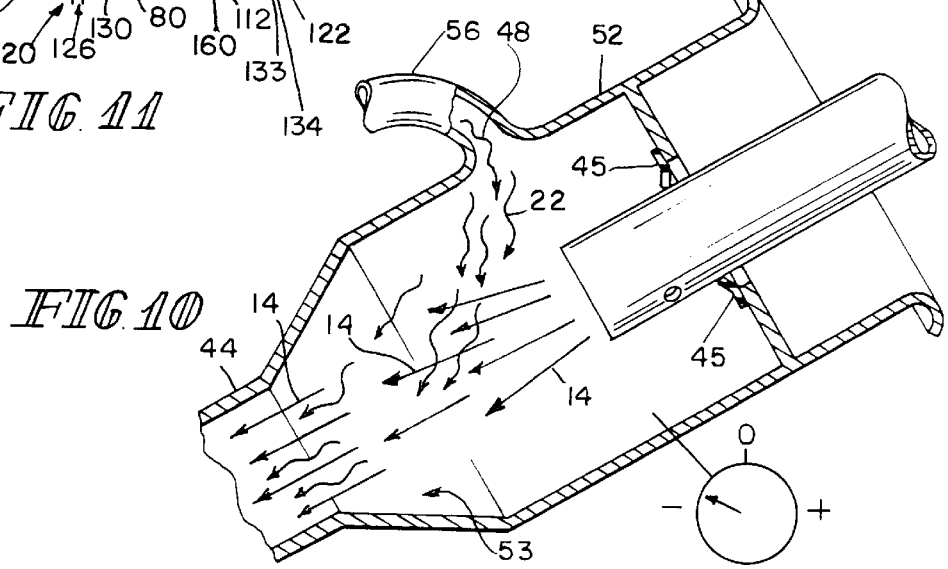
FIG. 10 is a cross-sectional view of the fill cup of FIG. 9 showing the liquid fuel being rapidly introduced to the fill cup through the fuel-dispensing nozzle creating elevated negative pressure drawing the large amount of fuel vapor/air mixture through the fuel vapor recirculation apparatus and the limited amount of outside air into the fill cup past the sealing mechanism.

As shown in FIGS. 9–11, liquid fuel 14 is introduced into fuel system 28 at a high rate of flow. This high rate of flow of liquid fuel 14 creates elevated pressure condition with elevated negative pressure within fill cup 52 so that fill cup 52 is below atmospheric pressure as represented by diagrammatic pressure gage 64 as shown in FIG. 10. Because elevated negative pressure exists in fill cup 52, pressure sensor 58 detects an even greater pressure differential between fill cup 52 at elevated negative pressure and fuel tank 12.

Accordingly, recirculation control valve 62 permits variable recirculation of fuel vapor/air mixture 48 through fuel vapor recirculation apparatus 38 based on the pressure levels in fill cup 52 and fuel tank 12. As previously mentioned, this recirculation of fuel vapor/air mixture 48 reduces the level of outside air 26 drawn into fill cup 52 and allows fuel vapor/air mixture 48 to be recirculated and condensed within fuel system 28.

As demonstrated by the assorted pressure conditions shown in FIGS. 3,4, 6,7,9, and 10, fuel vapor recirculation apparatus 38 reacts to changing pressure differentials between fill cup 52 and fuel tank 12. This responsiveness permits fuel vapor recirculation apparatus 38 to dynamically change the flow restriction and flow rate of fuel vapor/air mixture 48 from fuel tank 12 to fill cup 52. Thus, fuel vapor/air mixture 48 is communicated at flow rates dependent upon the pressure levels in fuel tank 12 and fill cup 52.

The dynamic control of flow rates of fuel vapor/air mixture 48 through fuel vapor recirculation apparatus 38 permits fuel system 28 to substantially maximize the reduction of outside air 26 drawn into fuel system 28 without a substantial threat of releasing fuel vapor/air mixture 48 through fill cup 52 into the atmosphere. A non-dynamic or fixed fuel vapor recirculation apparatus would not respond to changes in pressure differentials between a fuel tank and a fill cup. Such a system would either place too small of a restriction on the flow rate of the fuel vapor/air mixture to allow maximum reduction of outside air introduced to the fuel system and risk releasing fuel vapor/air mixture into the atmosphere through the fill cup or place too great of a restriction on the flow rate of the fuel vapor/air mixture to prevent excess flow of fuel vapor/air mixture through the fill cup and into the atmosphere and allow additional outside air into the fuel system. However, according to the present invention, the responsiveness of fuel vapor recirculation system 28 permits substantial maximization of the reduction of outside air drawn into fill cup 52 while substantially minimizing the threat of releasing fuel vapor/air mixture 48 into the atmosphere through fill cup 52.

According to the present disclosure, recirculation control valve 62 provides the dynamic responsiveness previously mentioned. Recirculation control valve 62 combines flow restrictor 60 and pressure sensor 58. As shown in FIGS. 5, 8, and 11, a presently preferred embodiment of a recirculation control valve 162 includes a housing 66 defining an interior region 68, an inlet passageway 70, and an outlet passageway 72, a pressure sensor 158 positioned to lie within interior region 68, and a flow restrictor 160 positioned to lie within interior region 68. Pressure sensor 158 includes a first diaphragm 74 and a first spring 82 positioned to lie between first diaphragm 74 and housing 66 as shown for example in FIG. 5. First diaphragm 74 includes a fill cup side 94, a fuel tank side 96, a valve seat 78, and an aperture 76 defined by valve seat 78.

First diaphragm 74 and a second diaphragm 80 partition interior region 68. First diaphragm 74 cooperates with housing 66 to define a fill cup reference chamber 88 as shown, for example, in FIG. 5. First and second diaphragms 74, 80 cooperate with housing 66 to define a fuel tank reference chamber 90. Fill cup reference chamber 88 is in fluid communication with fill cup 52 through outlet passageway 72 and fuel vapor recirculation conduit 56. Similarly, fuel tank reference chamber 90 is in fluid communication with fuel tank 12 through inlet passageway 72, fuel vapor recirculation conduit 56, fuel vapor discharge conduit 54, and ORVR control valve 46. Thus, fill cup reference chamber 88 is at substantially the same pressure level as fill cup 52 and fuel tank reference chamber 90 is at substantially the same pressure level as fuel tank 12.

Pressure sensor 158 reacts to changes in pressure differentials between fill cup 52 and fuel tank 14. Pressure differentials that exists between fill cup 52 and fuel tank 12 exist at substantially the same level or proportion in fill cup reference chamber 88 and fuel tank reference chamber 90, respectively. Such pressure differentials create unbalanced forces on fill cup and fuel tank sides 94, 96 of first diaphragm 74. For example, when greater pressure exists within fuel tank 12 or fuel tank pressure chamber 90 than in fill cup 52 or fill cup reference chamber 88, respectively, a greater force exist on fuel tank side 94 of first diaphragm 74 than exists on fill cup side 96 of first diaphragm 74.

When an unbalance in forces reaches a predetermined level, first diaphragm 74 will advance in direction 92. For example, in FIG. 8, the moderate rate of flow of liquid fuel 14 into fill cup 52 creates a moderately negative pressure level in fill cup 52. This creates a positive pressure differential between fuel tank and fill cup sides 94, 96 of first diaphragm 74, respectively and first diaphragm 74 moves between a first position as shown in FIG. 5 were the pressure differential was small to a second position as shown in FIG. 8 where the pressure differential was greater.

Similarly, in FIGS. 11, the high rate of flow of liquid fuel 14 into fill cup 52 creates a elevated negative pressure level in fill cup 52. This creates an even greater positive pressure differential between fuel tank and fill cup sides 94, 96 of first diaphragm 74, respectively and first diaphragm 74 moves even further from second position as shown in FIG. 8 to a third position as shown in FIG. 11. Many other positions are also possible other than the first, second, and third positions shown in FIGS. 5, 8, and 11 depending on the particular pressure differential between fill cup 52 and fill tank 12.

The particular level of pressure differential required to move first diaphragm 74 is set to a predetermined level. The predetermined level is set by the particular spring characteristics of first spring 82. First spring 82 biases first diaphragm 74 in direction 98 by pressing against housing 66 as shown in FIGS. 5, 8, and 11. Thus, spring 82 can be set to apply a compressive force against first diaphragm 74 so that a larger pressure differential is required between fuel tank and fill cup sides 94, 96 of first diaphragm 74 to move first diaphragm 74 from its first position as shown in FIG. 5. Likewise, the spring constant of first spring 82 can be selected to require a larger or smaller pressure differential between fuel tank 12 and fill cup 52 to move first diaphragm 74 a particular distance in direction 92.

Flow restrictor 160 regulates the flow rate of fuel vapor/air mixture 48 that travels through fuel vapor recirculation conduit 56 from fuel tank 12 to fill cup 52. Flow restrictor 160 includes first and second diaphragms 74, 80, a second spring 112 positioned to lie between first and second diaphragms 74, 80, a valve member 110 positioned to lie between second spring 112 and valve seat 78 of first diaphragm 74, and a ram 114 coupled to housing 66 as shown for example in FIGS. 5, 8, 11. Second spring 112 biases valve member 110 in direction 92 toward valve seat 78 and ram 114.

As first diaphragm 74 moves in reaction to changing pressure differentials as discussed above, flow restrictor 160 changes the degree of restriction in fuel vapor recirculation conduit 56. As first diaphragm 74 moves in direction 92 in response to pressure differentials, as discussed above, second diaphragm 80, second spring 112, and valve member 110 also move in direction 92. As shown in FIG. 5, a gap 116 exists between ram 114 and valve member 110. However, as first and second diaphragms 74, 80, second spring 112, and valve member 110 move in direction 92, gap 116 decreases until gap 116 is closed as shown in FIGS. 8 and 11. When gap 116 is closed, ram 114 prevents valve member 110 from moving further in direction 92. However, first and second diaphragms 74, 80 and second spring 112 continue to move in direction 92 creating a gap 118 between valve seat 78 and valve member 110 as shown, for example, in FIG. 8.

Gap 118 provides a flow passageway 120 from inlet passageway 70 to outlet passageway 72 through aperture 76 of first diaphragm 74 as shown in FIG. 8. As the pressure differential increases between fuel tank 12 and fill cup 52, gap 118 increases as shown in FIG. 11. In response, flow passageway 120 becomes less restrictive and allows greater flow of fuel vapor/air mixture 48 through fuel vapor recirculation apparatus 38. Thus, flow passageway 120 is closed as shown in FIG. 5 when a small pressure differential exists between fuel tank 12 and fill cup 52, slightly open when a moderate pressure differential exists between fuel tank 12 and fill cup 52, and significantly open when an elevated pressure differential exists between fuel tank 12 and fill cup 52.

Recirculation control valve 162 includes first and second pressure check valves 120, 122 having first and second check balls 130, 132 and first and second check valve seats 131, 133 to aid in the travel of second diaphragm 80. Second diaphragm 80 and housing 66 define a third chamber 124. As second diaphragm 80 moves back and forth in directions 92, 98 in response to pressure differential changes between fuel tank 12 and fill cup 52, air within third chamber 124 is expanded or compressed, respectively.

This expanded or compressed air hampers the motion of second diaphragm 80 in directions 92, 98. However, first check valve 120 is positioned to lie within housing 66 and creates an air passageway 126 between third chamber 124 and the atmosphere. Thus, when second diaphragm 80 moves in direction 92 and expands the air within chamber 124 to create negative gage pressure between third chamber 124 and the atmosphere, first check ball 130 lifts to open air passageway 126 and relieve the negative pressure within third chamber 124. Because the pressure within third chamber 124 is relieved, the movement of second diaphragm 80 in direction 92 is not significantly hampered.

Similarly, second check valve 122 is positioned to lie within second diaphragm 80 and creates an air passageway 134 between third chamber 124 and fuel tank reference chamber 90. When second diaphragm 80 moves in direction 98 and compresses air 26 to create positive pressure between third chamber 124 and fuel tank reference chamber 90, second check ball 130 lifts to open air passageway 134 and relieve the positive pressure within third chamber 124. Because the pressure within third chamber 124 is relieved, the movement of second diaphragm 80 in direction 98 is not significantly hampered.

Other configurations of the recirculation control valve are also within the scope of the present disclosure. For example, the flow restrictor may be a ball valve, a butterfly valve, a solenoid valve, or any other valve-type restrictor known to one of ordinary skill in the art. Furthermore, the flow restrictor may be coupled anywhere to the conduit or other component of the fuel vapor recirculation apparatus to control the flow rate through the fuel vapor recirculation apparatus. Furthermore, the pressure sensor may be a differential pressure sensor or any other pressure detector that detects the pressure level in the fill cup with reference to the fuel tank or other reference point. The sensor may be mechanically, pneumatically, or electrically coupled to the flow restrictor in any manner such that it controls the restriction provided by the flow restrictor.

Although the invention has been disclosed in detail with reference to certain preferred embodiments, variations and modifications exist within the scope and spirit of the invention.

What is claimed is:

1. A fuel system comprising
   a fuel tank formed to include an interior region,
   a fuel vapor discharge apparatus coupled to the fuel tank to vent fuel vapor from the interior region of the fuel tank,
   a fuel delivery apparatus formed to include an interior region and coupled to the fuel tank to deliver fuel to the interior region of the fuel tank, and
   a fuel vapor recirculation apparatus in fluid communication with the interior region of the fuel tank to deliver fuel vapor from the interior region of the fuel tank to the interior region of the fuel delivery apparatus, the fuel vapor recirculation apparatus including a sensor in fluid communication with the interior region of the fuel delivery apparatus to sense pressure extant in the interior region of the fuel delivery apparatus, a housing, and a flow restrictor coupled to the sensor and positioned to lie in the housing to move between a first position restricting the flow of fuel vapor from the fuel tank to the fuel delivery apparatus in response to sensations from the sensor without regard to changes in the vapor pressure extant in the interior region of the fuel tank and a second position permitting flow of fuel vapor from the fuel tank to the fuel delivery apparatus.

2. The fuel system of claim 1, wherein the housing is formed to include an inlet in fluid communication with the fuel tank and an outlet in fluid communication with the fuel delivery apparatus and the sensor is positioned to lie in the housing between the inlet and outlet.

3. The fuel system of claim 2, wherein the sensor is a diaphragm formed to include an aperture configured to permit flow of fuel vapor from the inlet to the outlet through the diaphragm and the flow restrictor includes a valve member positioned to lie adjacent to the aperture and a spring positioned to lie between the valve member and the housing to bias the valve member to the first position.

4. The fuel system of claim 1, wherein the sensor is a differential pressure sensor in fluid communication with the interior region of the fuel tank and the interior region of the fuel delivery apparatus.

5. The fuel system of claim 1, wherein the sensor includes a diaphragm having a first side and a second side facing away from the first side and in fluid communication with the interior region of the fuel delivery apparatus.

6. The fuel system of claim 5, wherein the first side of the diaphragm is in fluid communication with the interior region of the fuel tank and arranged to move the flow restrictor in response to pressure differentials between the interior region of the fuel delivery apparatus and the interior region of the fuel tank.

7. The fuel system of claim 5, wherein the diaphragm is formed to include a body portion and a valve seat defining an aperture and the flow restrictor includes a valve member and a spring positioned to bias the valve member into engagement with the valve seat.

8. A fuel system comprising
a fuel tank formed to include an interior region,
a fuel vapor discharge apparatus coupled to the fuel tank to vent fuel vapor from the interior region of the fuel tank,
a fuel delivery apparatus formed to include an interior region and coupled to the fuel tank to deliver fuel to the interior region of the fuel tank, and
a fuel vapor recirculation apparatus in fluid communication with the interior region of the fuel tank to deliver fuel vapor from the interior region of the fuel tank to the interior region of the fuel delivery apparatus, the fuel vapor recirculation apparatus including a sensor in fluid communication with the interior region of the fuel delivery apparatus to sense pressure extant in the interior region of the fuel delivery apparatus, a housing, and a flow restrictor coupled to the sensor and positioned to lie in the housing to move between a first position restricting the flow of fuel vapor from the fuel tank to the fuel delivery apparatus in response to sensations from the sensor and a second position permitting flow of fuel vapor from the fuel tank to the fuel delivery apparatus, wherein the pressure sensor includes a first diaphragm, the flow restrictor includes a valve member, a second diaphragm, and a spring positioned to lie between the valve member and the second diaphragm.

9. The fuel system of claim 8, wherein the first diaphragm is formed to include an aperture and the spring biases the valve member toward the aperture to restrict the flow of fuel vapor therethrough.

10. A fuel system comprising
a fuel tank formed to include an interior region,
a fuel vapor discharge apparatus coupled to the fuel tank to vent fuel vapor from the interior region of the fuel tank,
a fuel delivery apparatus formed to include an interior region and coupled to the fuel tank to deliver fuel to the interior region of the fuel tank, and
a fuel vapor recirculation apparatus in fluid communication with the interior region of the fuel tank to deliver fuel vapor from the interior region of the fuel tank to the interior region of the fuel delivery apparatus, the fuel vapor recirculation apparatus including a sensor in fluid communication with the interior region of the fuel delivery apparatus to sense pressure extant in the interior region of the fuel delivery apparatus, a housing, and a flow restrictor coupled to the sensor and positioned to lie in the housing to move between a first position restricting the flow of fuel vapor from the fuel tank to the fuel delivery apparatus in response to sensations from the sensor and a second position permitting flow of fuel vapor from the fuel tank to the fuel delivery apparatus, wherein the housing includes an inlet in fluid communication with the interior region of the fuel tank and an outlet in fluid communication with the interior region of the fuel delivery apparatus, the flow restrictor includes a diaphragm positioned to lie in the housing, the diaphragm cooperates with the housing to define a chamber therebetween, the flow restrictor further includes a check valve arranged to permit fluid communication between the chamber and the outlet of the housing.

11. The fuel system of claim 10, wherein the check valve is coupled to the diaphragm.

12. The fuel system of claim 10, wherein the flow restrictor further includes another check valve coupled to the housing and arranged to permit fluid communication between the chamber and the atmosphere.

13. A fuel system comprising
a fuel tank formed to include an interior region,
a fuel vapor discharge apparatus coupled to the fuel tank to vent fuel vapor from the interior region of the fuel tank,
a fuel delivery apparatus formed to include an interior region and coupled to the fuel tank to deliver fuel to the interior region of the fuel tank, and
a fuel vapor recirculation apparatus in fluid communication with the interior region of the fuel tank to deliver fuel vapor from the interior region of the fuel tank to the interior region of the fuel delivery apparatus, the fuel vapor recirculation apparatus including a sensor in fluid communication with the interior region of the fuel delivery apparatus to sense pressure extant in the interior region of the fuel delivery apparatus, a housing, and a flow restrictor coupled to the sensor and positioned to lie in the housing to move between a first position restricting the flow of fuel vapor from the fuel tank to the fuel delivery apparatus in response to sensations from the sensor and a second position permitting flow of fuel vapor from the fuel tank to the fuel delivery apparatus, wherein the housing includes an inlet in fluid communication with the interior region of the fuel tank and an outlet in fluid communication with the interior region of the fuel delivery apparatus, the flow restrictor includes a diaphragm positioned to lie in the housing, the diaphragm cooperates with the housing to define a chamber therebetween, the flow restrictor further includes a check valve arranged to permit fluid communication between the chamber and atmosphere.

14. The fuel system of claim 13, wherein the check valve is coupled to the housing.

15. A fuel system comprising
a fuel tank formed to include an interior region,
a fuel delivery apparatus formed to include an interior region and coupled to the fuel tank, and
a fuel vapor recirculation apparatus in fluid communication with the interior region of the fuel tank and the interior region of the fuel delivery apparatus, the fuel vapor recirculation apparatus including a housing, a valve member positioned to lie in the housing to move between a first position restricting the flow of fuel vapor from the fuel tank to the fuel delivery apparatus and a second position permitting the flow of fuel vapor from the fuel tank to the fuel delivery apparatus and means for sensing pressure extant in the interior region of the fuel delivery apparatus, the sensing means controlling the movement of the valve between the first and second positions based on the pressure sensed in the interior region of the fuel delivery apparatus.

16. The fuel system of claim 15, wherein the sensing means includes a diaphragm in fluid communication with the interior region of the fuel delivery apparatus.

17. The fuel system of claim 16, wherein the diaphragm is in fluid communication with the interior region of the fuel tank.

18. The fuel system of claim 15, wherein the sensing means is positioned to lie in the housing.

19. The fuel system of claim 18, wherein the housing is formed to include an inlet in fluid communication with the interior region of the fuel tank and an outlet in fluid communication with the interior region of the fuel delivery apparatus, the sensing means includes a diaphragm positioned to lie in the housing between the inlet and outlet and is formed to include an aperture, and the valve member is positioned to restrict the flow of fuel vapor through the aperture while in the first position and permit the flow of fuel vapor through the aperture while in the second position.

20. A method for communicating fuel vapor from an interior region of a vehicle fuel tank to an interior region of a fuel delivery apparatus coupled to the vehicle fuel tank, the method comprising the steps of providing a conduit defining a passage configured to communicate fuel vapor from an interior region of a fuel tank to an interior region of a fuel delivery apparatus and a valve coupled to the conduit and including a flow restrictor configured to move between a first position restricting the flow of fuel vapor through the passage and a second position permitting the flow of fuel vapor through the passage and a sensor coupled to the valve, sensing pressure extant in the interior region of the fuel delivery apparatus, and moving the valve to the second position when pressure extant in the interior region of the fuel delivery apparatus is at a predetermined level, irrespective of pressure extant in the interior region of the fuel tank.

21. The method of claim 20, wherein the step of sensing the pressure includes referencing the pressure extant in the interior region of the fuel tank.

22. The method of claim 20, wherein the sensor includes a diaphragm in fluid communication with the interior region of the fuel delivery apparatus.

23. The method of claim 22, wherein the diaphragm is in fluid communication with the interior region of the fuel tank.

* * * * *